(12) United States Patent
Watanabe

(10) Patent No.: US 6,693,765 B2
(45) Date of Patent: Feb. 17, 2004

(54) INFORMATION STORAGE APPARATUS AND METHOD OF CONTROLLING THE SAME

(75) Inventor: Hideyuki Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 138 days.

(21) Appl. No.: 09/791,277

(22) Filed: Feb. 22, 2001

(65) Prior Publication Data

US 2001/0006439 A1 Jul. 5, 2001

Related U.S. Application Data

(63) Continuation of application No. PCT/JP99/01266, filed on Mar. 16, 1999.

(30) Foreign Application Priority Data

Sep. 21, 1998 (JP) .......................................... 10-266995

(51) Int. Cl.[7] ............................................... G11B 5/55
(52) U.S. Cl. ..................................... 360/78.01; 360/61
(58) Field of Search ..................... 360/75, 72.1, 77.08, 360/61, 69; 711/111–113; 710/7

(56) References Cited

U.S. PATENT DOCUMENTS 5,465,343 A * 11/1995 Henson et al. ................ 710/7
6,209,058 B1 * 3/2001 Shats et al. .................. 360/71

FOREIGN PATENT DOCUMENTS

| JP | 63003357 | 1/1988 |
| JP | 54046322 | 2/1993 |
| JP | 6290543 | 10/1994 |
| JP | 9063198 | 3/1997 |

* cited by examiner

Primary Examiner—David Hudspeth
Assistant Examiner—K. Wong
(74) Attorney, Agent, or Firm—Greer, Burns & Crain, Ltd.

(57) ABSTRACT

The present invention relates to an information storage apparatus for storing information in a recording medium and to a data transfer method. A particular object of the present invention is to provide an information storage apparatus and a data transfer method, which realize a high-speed transfer of control parameters without deteriorating performance of a control operation. The present invention includes an automatic transfer processing part 102 which transfers control parameters stored in a memory 15 by DMA transfer to an RDC 9, a servo information demodulation circuit 10, a head IC 8, and a DSP 17. The memory 15 is connected to an MCU 101 which controls a read/write operation of a magnetic disk unit 100.

9 Claims, 15 Drawing Sheets

INFORMATION STORAGE APPARATUS AND METHOD OF CONTROLLING THE SAME

This application is a continuation of PCT/JP99/012266 filed on Mar. 16, 1999.

TECHNICAL FIELD

The present invention relates to information storage apparatuses and methods of controlling the same, and more particularly to an information storage apparatus which records information on a recording medium and a method of controlling the same.

BACKGROUND ART

In an information storage apparatus such as a magnetic disk unit or a magneto-optical disk unit, a variety of variable control parameters such as a threshold for signal detection and a light-emitting power of a laser beam are set to their optimum values at times of recording and reproduction. The light-emitting power of the laser beam is controlled based on the set parameters so that the recording and reproduction are performed in an optimum state. Here, a description will be given of a magnetic disk unit serving as an information storage apparatus.

FIG. 1 is a block diagram of a conventional magnetic disk unit.

According to a magnetic disk unit 1, a magnetic head 4 opposes a magnetic disk 2 which is rotated by a spindle motor 3, so that the magnetic disk 2 is magnetized by a magnetic field produced around the magnetic head 4. Thereby, information is recorded on the magnetic disk 2. On the other hand, information recorded on the magnetic disk 2 is reproduced by detecting variations in magnetization of the magnetic disk 2.

The magnetic head 4 is supported at the tip of an arm 5 and opposes the magnetic disk 2, the magnetic head 4 being floated slightly above the magnetic disk 2 by an air current produced by rotations of the magnetic disk 2. The arm 5 is held so as to turn freely around a shaft 6. The other end of the arm 5 is linked to a voice coil motor 7. The voice coil motor 7 turns the arm 5 in a radial direction (direction indicated by arrow A) of the magnetic disk 2 around the shaft 6.

The magnetic head 4 is connected to a head IC 8. The head IC 8 amplifies a recording signal supplied to the magnetic head 4 and a reproduced signal reproduced by the magnetic head 4.

The head IC 8 is connected to a read channel (RDC) IC 9 and to a servo information demodulation circuit 10. The read channel IC 9 demodulates the reproduced signal supplied from the head IC 8 to its original data, and modulates recording data to be recorded on the magnetic disk 2 to generate the recording signal. The servo information demodulation circuit 10 extracts servo information from the reproduced signal supplied from the head IC 8 and demodulates the extracted servo information.

The reproduced data demodulated in the read channel IC 9 is supplied to a hard disk control IC (HDC) 11. The hard disk control IC 11 retains the reproduced data in a memory 12 and transfers the retained reproduced data to a host computer via an interface. The hard disk control IC 11 temporarily stores in the memory 12 the recording data supplied from the host computer via the interface, and supplies the stored recording data to the read channel IC 9.

The read channel IC 9 and the hard disk control IC 11 are connected to an MCU 14. The servo information demodulation circuit 10 and a digital signal processor (DSP) 17 are connected to the MCU 14 via a gate array 16.

The MCU 14 controls operations of the head IC 8, the read channel IC 9, the servo information demodulation circuit 10, and the digital signal processor (DSP) 17 based on a control program and control parameters stored in a memory 15.

A driver IC 18 is connected to the digital signal processing circuit 17. The driver IC 18 generates, based on a control signal supplied from the digital signal processor 17, driving signals which drive the voice coil motor 7 and the spindle motor 3, respectively. The voice coil motor 7 is driven based on the driving signal supplied from the driver IC 18 to move the magnetic head 4 in the radial directions of the magnetic disk 2, that is, in the direction indicated by the arrow A. The spindle motor 3 is driven by the driving signal supplied from the driver IC 18 to rotate the magnetic disk 2 on a shaft 19.

A temperature sensor 20 is connected to the MCU 14. The temperature sensor 20 detects an ambient temperature of the magnetic disk 2. A temperature detected by the temperature sensor 20 is supplied to the DSP 17 via the gate array 16. The MCU 14 controls the control parameters supplied to the read channel IC 9, the head IC4, the servo information demodulation circuit 10, and the DSP 17 based on, for instance, a generated error or the temperature detected by the temperature sensor 20.

At this time, the control parameters supplied to the read channel IC 9, the servo information demodulation circuit 10, and the DSP 17 are stored in the memory 15. When a write command and a read command are supplied to the MCU 14 from the host computer, the MCU 14 reads out the control parameters from the memory 15 based on the control program, and supplies the control parameters to the respective circuits. The main control parameters are a servo parameter and read and write parameters.

FIG. 2 is an operational flowchart of an MCU of the conventional magnetic disk unit at a time of a read/write operation.

When supplied with a write or read command from the host computer (step S1-1), the MCU 14 supplies servo parameters that are control parameters, one byte at a time, that is, one word at a time, from the memory 15 to the servo information demodulation circuit 10 and the digital signal processor 17 (steps S1-2 and S1-3). The servo parameters are parameters that control a driving of the voice coil motor 7 and a reading of servo information at a time of, for instance, a tracking jump.

When the servo parameters are supplied to the servo information demodulation circuit 10 and to the digital signal processor 17 in step S1-3 (steps S1-4 and S1-5), the MCU 14 starts a seek operation to a head number X and a cylinder number Y specified by the write or read command supplied from the host computer (step S1-6).

When the seek operation to the given head number X and cylinder number Y is started in step S1-6, read or write (read/write) parameters that are control parameters are supplied to the read channel 9 one byte at a time, that is, one word at a time (step S1-7). The read/write parameters are parameters that control signal reading and writing states.

When the read/write parameters are set in the read channel IC 9 in step S1-7 (steps S1-8 and S1-9), and the seek operation to the head number X and cylinder number Y specified by the write or read command supplied from the host computer is completed (step S1-10), a read/write operation is performed (step S1-11).

In the conventional magnetic disk unit, the transfers of the control parameters and the seek operation of the above-described steps S1-1 through S1-11 are processed by firmware executed by the MCU.

In the case of transferring control parameters required for read/write control and servo control at a time of a read/write operation to a read/write control part and to a servo control part the transfer is performed by the MCU. Therefore, the MCU is prevented from performing other operations during the transfer of the control parameters, thus causing a problem of deterioration in the performance of the MCU.

FIG. 3 is a timing chart of signals in the conventional magnetic disk unit. FIG. 3(A) shows a servo gate signal, FIG. 3(B) shows a timing of a seek command, FIG. 3(C) shows a timing of a parameter transfer, FIG. 3(D) shows a timing of issuance of a seek command, and FIG. 3(E) shows a timing of the start of processing the command.

As shown in FIG. 3, after the seek command is generated, parameters are transferred. At this time, it takes 50 μs to perform the parameter transfer by firmware. Therefore, as shown in FIG. 3(A), the transfer of the parameters overlaps with a generation timing of the servo gate signal, so that the seek command is delayed by the parameter transfer. Consequently, the read/write performance is deteriorated.

Further, if alterations of the control parameters, or increases and decreases in the control parameters are required, it is necessary to alter a transfer-related portion of the firmware.

Moreover, in the case of a transfer performed by the firmware, an operation of checking completion of the transfer is performed for every byte or word in general. Therefore, a certain waiting period is required after the execution of a transfer. Thus, the operation efficiency is deteriorated in the case of the transfer of the control parameters performed by the firmware. If the performance of a drive, such as the number of revolutions of a spindle motor or a data transfer rate, is improved in the future so as to require a microcontroller of the drive to operate at higher speeds, there will be a problem that a time required for the transfer performed by the firmware causes the deterioration of the operation efficiency of the drive.

DISCLOSURE OF THE INVENTION

The present invention is made in the light of the above-described points, and an object of the present invention is to provide an information storage apparatus which realizes a high-speed transfer of control parameters without deteriorating performance of a control operation, and a method of controlling such an information storage apparatus.

An information storage apparatus of the present invention, which apparatus has storage means for storing control information for controlling a state of access to a recording medium, and control means for controlling the state of access to the recording medium based on the control information, includes transfer control means for transferring the control information stored in the storage means to the control means at a time of accessing the recording medium, the transfer control means including: first retention means for retaining a control information storage address of the storage means where the control information is stored; second retention means for retaining numbers of data of the control information to be transferred to the control means; control information reading means for successively reading out the control information of the numbers of data stored in the second retention means from the control information storage address stored in the first retention means; and data switching means for switching transfer destinations of the control information read out by the control information reading means based on the numbers of data stored in the second retention means.

In the information storage apparatus of the present invention, the data switching means includes counting means for counting down the numbers of data stored in the second retention means every time the control information is read out by the control information reading means, and switching control means for switching the transfer destinations of the control information read out by the control information reading means when a count value of the counter means becomes zero.

In the information storage apparatus of the present invention, the transfer control means is formed integrally on an integrated circuit which forms the control means.

Another information storage apparatus of the present invention, which apparatus has storage means for storing control information for controlling a state of access to a recording medium, and control means for controlling the state of access to the recording medium based on the control information, includes transfer control means which transfers the control information stored in the storage means to the control means at a time of accessing the recording medium, the transfer control means including: first retention means for retaining a control information storage address of the storage means where the control information is stored; second retention means for retaining transfer destination switching information inserted into the control information stored in the storage means; third retention means for retaining transfer termination information stored at an end position of the control information stored in the storage means; control information reading means for successively reading out the control information from the control information storage address stored in the first retention means; and data switching means for comparing the transfer destination switching information retained in the second retention means and the transfer termination information retained in the third retention means with the control information read out by the control information reading means so as to switch transfer destinations of the control information read out from the control information reading means when the control information read out by the control information reading means matches the transfer destination switching information retained in the second retention means, and to terminate a transfer of the control information read out by the control information reading means when the control information read out by the control information reading means matches the transfer termination information retained in the third retention means.

A method of controlling an information storage apparatus according to the present invention by prestoring control information for controlling a state of access to a recording medium and controlling the state of access to the recording medium based on the control information, is characterized in that the control information stored in the storage means is transferred to the control means at a time of accessing the recording medium.

In the method of controlling an information storage apparatus according to the present invention, a control information storage address of the storage means where the control information is stored, and numbers of data of the control information to be transferred are retained, and the control information of the retained numbers of data are successively read out from the retained control information storage address, so that transfer designations of the read control information are switched based on the numbers of data.

In the method of controlling an information storage apparatus according to the present invention, the numbers of data are counted down every time the control information is read out, and the transfer destinations of the control information are switched when a count value becomes zero.

In the method of controlling an information storage apparatus according to the present invention, the control information storage address where the control information is stored, transfer destination switching information inserted into the control information to switch the transfer destinations of the control information, and transfer termination information which indicates an end position of the control information are retained; the control information is successively read out from the control information storage address to be compared with the transfer destination switching information and the transfer termination information; the transfer destinations of the read control information are switched when the read control information matches the transfer destination switching information; and a transfer of the read control information is terminated when the read control information matches the transfer termination information.

According to the information storage apparatus and the method of controlling the same of the present invention, the direct transfers of control information to the transfer designations save time spent in a control information reading operation. Therefore, other operations can be performed efficiently, thus allowing a high-speed reading/writing of information.

Further, according to the information storage apparatus and the method of controlling the same of the present invention, the control information is successively read out from a control information storage address based on the control information storage address and the number of data transferred to each of the transfer designations of the control information, and the transfer designations of the control information are only switched based on the number of data of the read control information. Therefore, distribution control of the control information can be performed easily.

Moreover, according to the information storage apparatus and the method of controlling the same of the present invention, a timing of the switching can be easily detected by counting down the retained number of data at a time of reading out the control information.

Furthermore, according to the information storage apparatus and the method of controlling the same of the present invention, transfer destination switching information is inserted into a given portion of control information so that the control information can be directly transferred to transfer destinations thereof by switching the transfer destinations when the transfer destination switching information is detected, thus saving time spent in a control information reading operation. Therefore, other operations can be performed efficiently, thus allowing a high-speed reading/ writing of information.

BEST MODE FOR CARRYING OUT THE INVENTION

Figure 1:
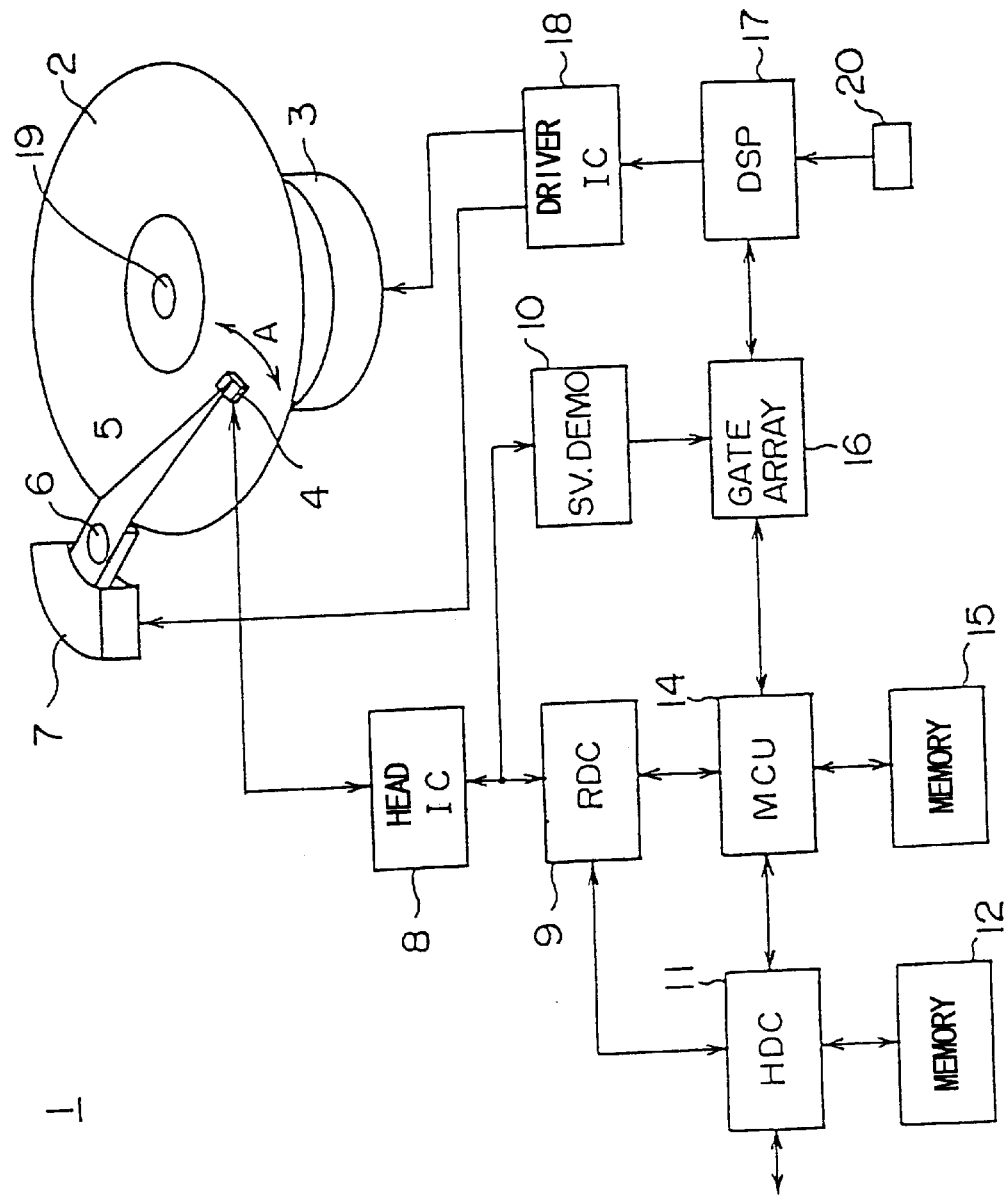
FIG. 1 is a block diagram of a conventional magnetic disk unit.
Figure 2:
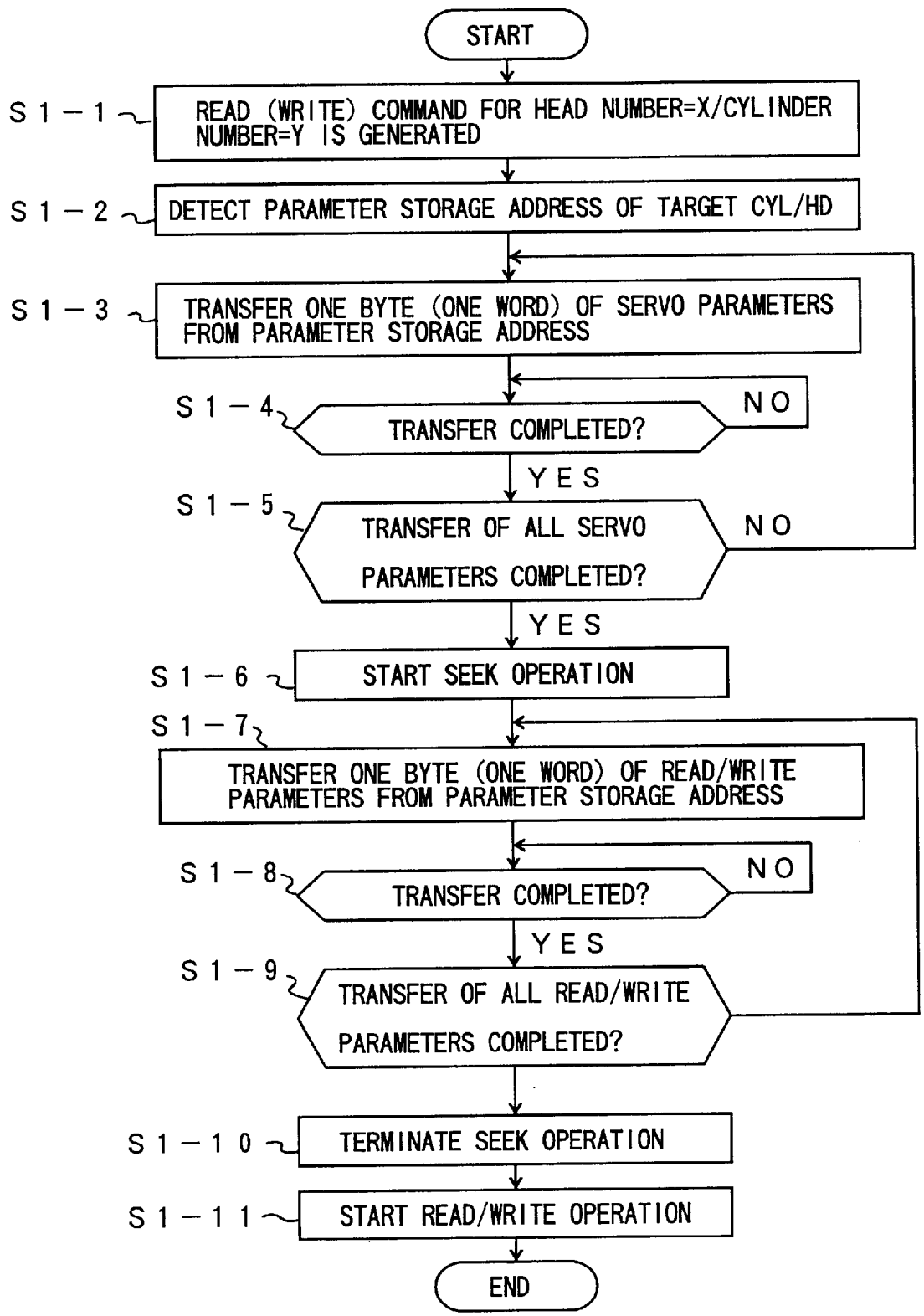
FIG. 2 is an operational flowchart of the conventional magnetic disk unit at a time of a read/write operation.
Figure 3:
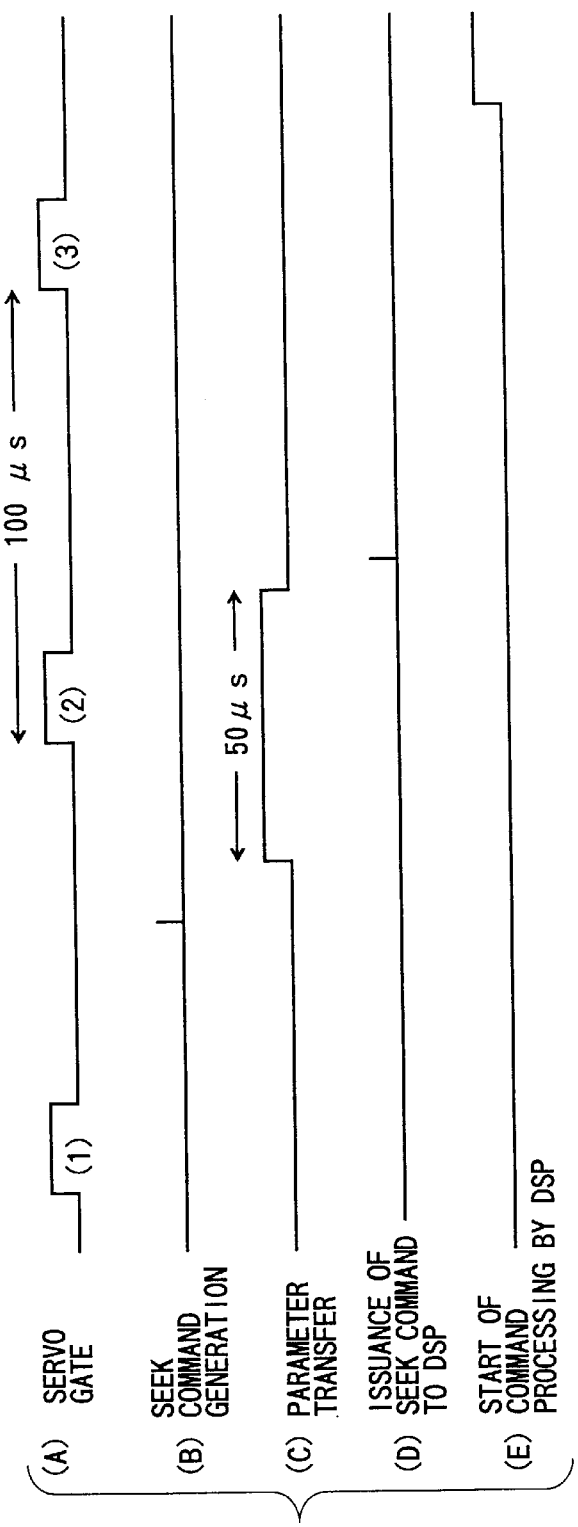
FIG. 3 is a timing chart of signals in the conventional magnetic disk unit.
Figure 4:
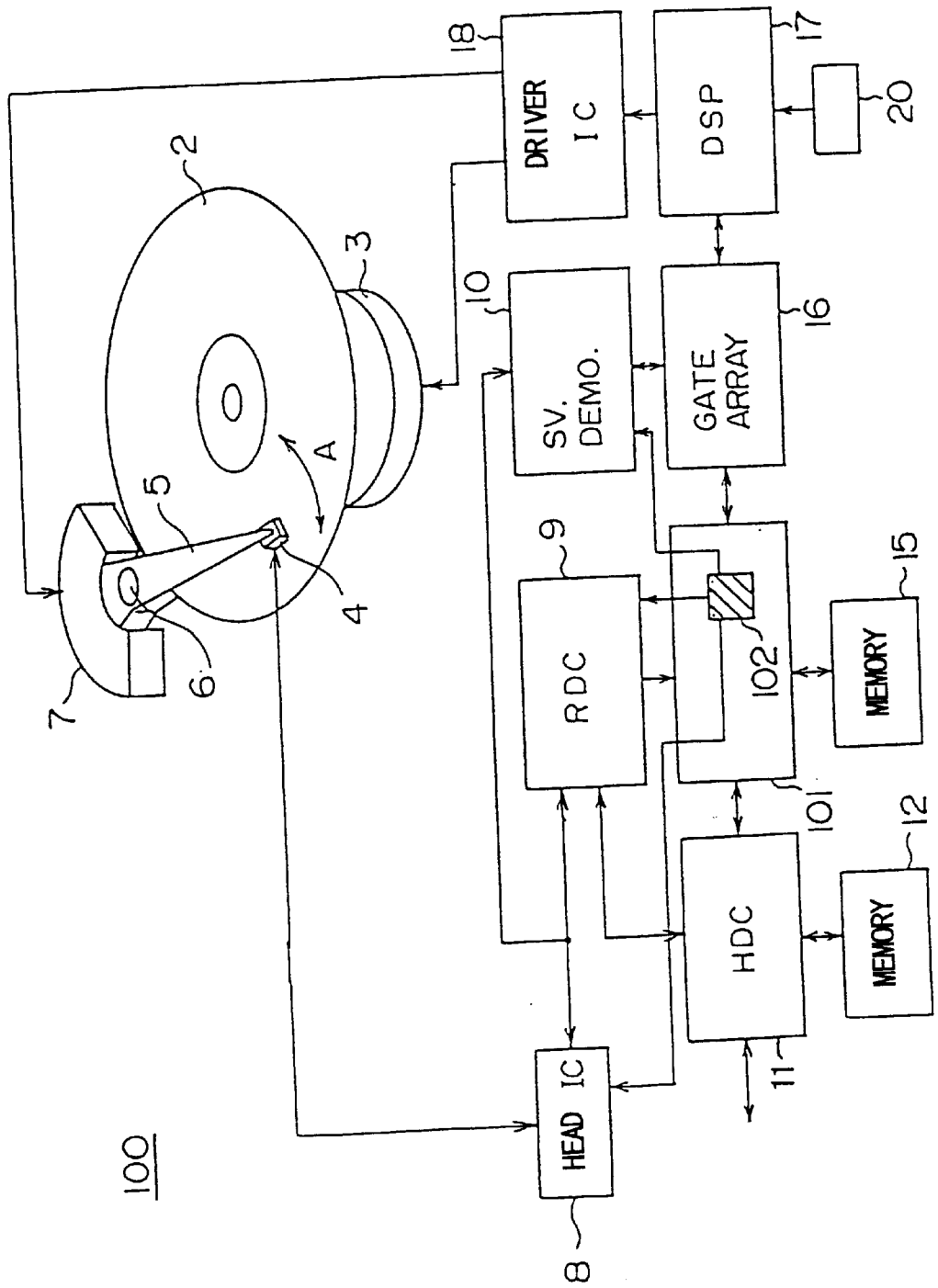
FIG. 4 is a block diagram of a first embodiment of the present invention.

FIG. 4 is a block diagram of a first embodiment of the present invention. In the figure, the same elements as those of FIG. 1 are referred to by the same numerals, and a description thereof will be omitted.

In this embodiment, a description will be given of a magnetic disk unit serving as an information storage apparatus.

A magnetic disk unit 100 of this embodiment includes an automatic transfer processing part 102 in an MCU 101. The automatic transfer processing part 102 transfers by DMA transfer the control parameters stored in the memory 15 to the RDC 9, the servo information demodulation circuit 10, the head IC 8, and the DSP 17.

Figure 6:
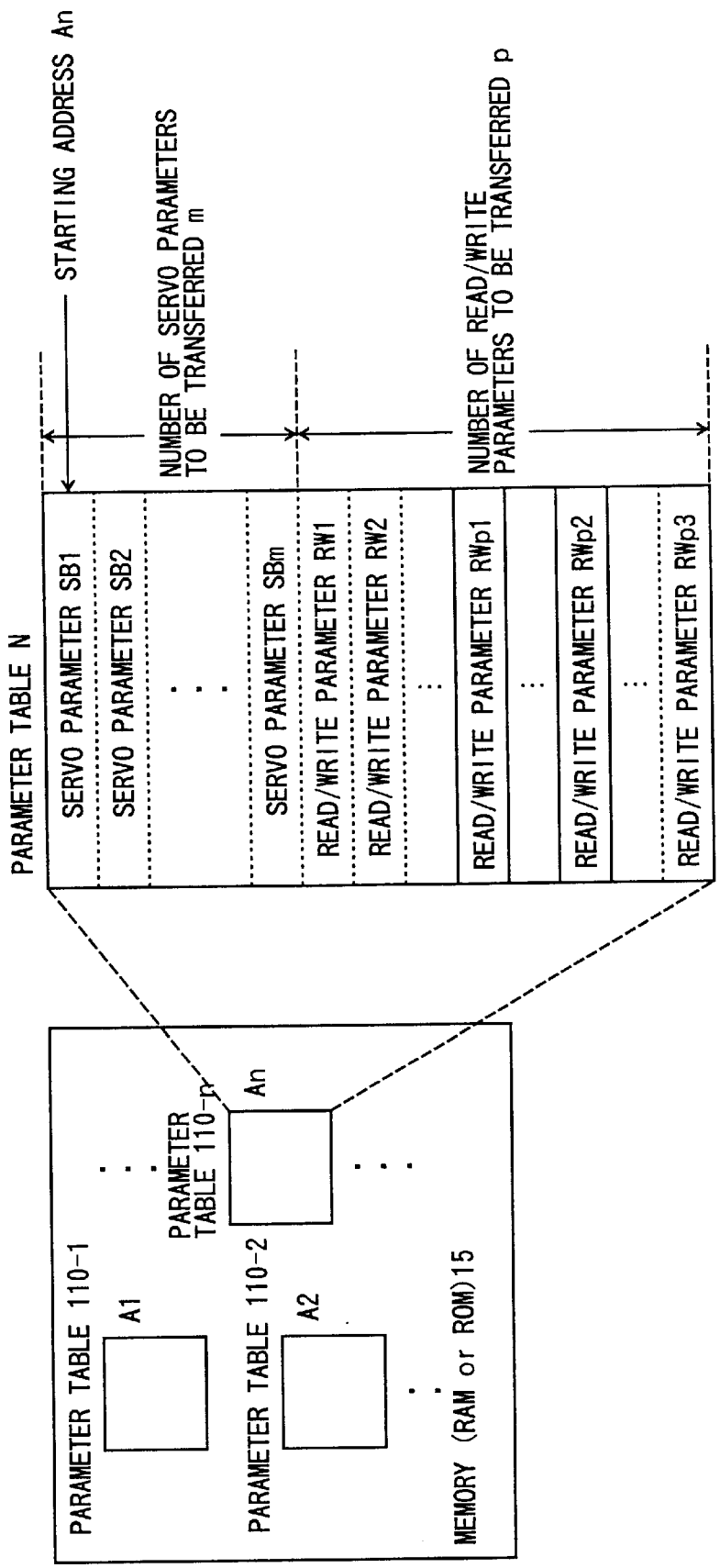
FIG. 6 is a diagram of a data structure of a parameter table of the first embodiment of the present invention.

FIG. 6 is a diagram of a data structure of each parameter table of the first embodiment of the present invention.

Parameter tables 110-1 through 110-n, which store servo parameters and read/write parameters to be supplied to the RDC 9, the servo information demodulation circuit 10, the head IC 8, and the DSP 17, are set in the memory 15 in correspondence with zone/head numbers.

The parameter table 110-1 includes servo parameters SB1 through SBm and read/write parameters RW1 through RWp.

The servo parameters SB1 through SBm and the read/write parameters RW1 through RWp are stored consecutively from a starting address A1.

At the time of a read/write operation, a parameter table which corresponds to a given zone (cylinder)/head number is selected from the parameter tables 110-1 through 110-n stored in the memory 15 to be read out to the MCU 101.

Figure 5:
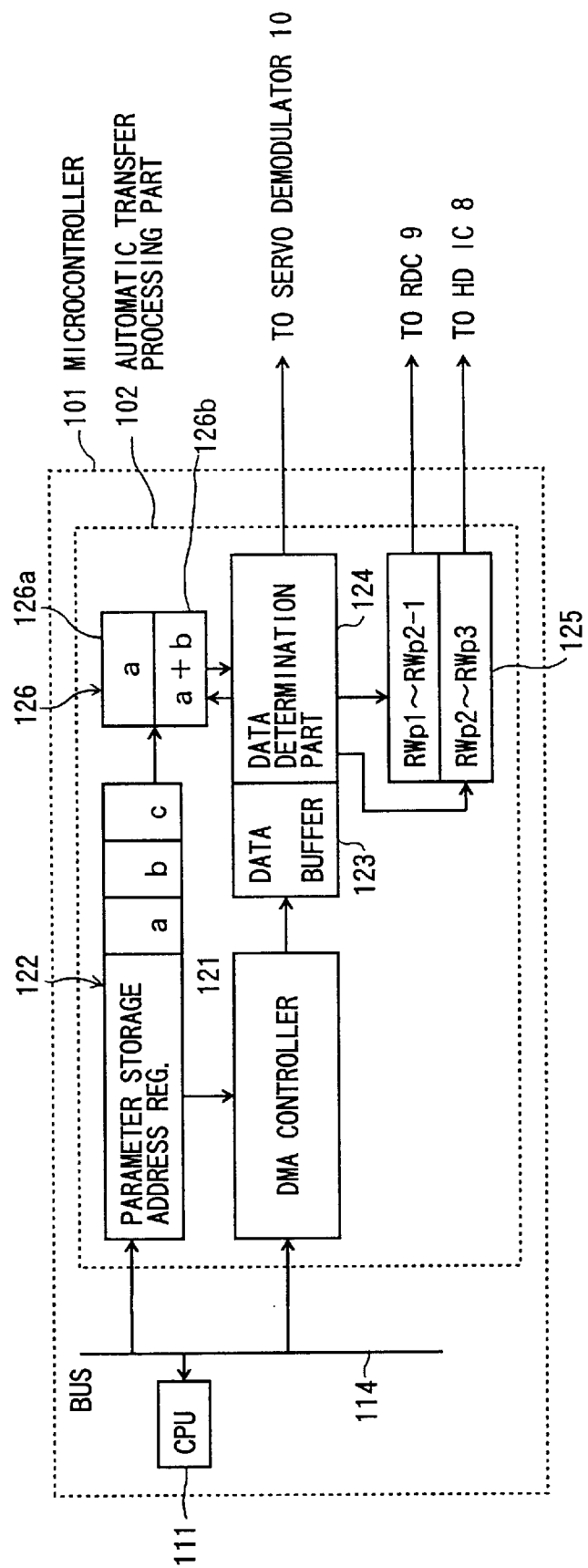
FIG. 5 is a block diagram of an MCU of the first embodiment of the present invention.

FIG. 5 is a block diagram of the MCU of the first embodiment of the present invention.

The MCU 101 includes a CPU 111 and a bus 114 in addition to the automatic transfer processing part 102.

The CPU 111 is connected to the memory 15 via the bus 114, and performs a variety of control operations, such as read/write control and servo control, by firmware stored in the memory 15.

The automatic transfer processing part 102 includes a DMA controller 121, a register 122, a data buffer 123, a data determination part 124, a serial/parallel conversion part 125, and a counter 126. The DMA controller 121 stores parameter storage addresses and the number of data of the control parameters supplied to each of the circuits 8 through 10 in the register 122 based on a control data transfer command supplied from the HDC 11 based on a read/write command.

The register 122 stores a starting address An of the parameter table 110-$n$, the number of transfer data a of the servo parameters SB1 through SBm to be supplied to the servo information demodulation circuit 10, the number of transfer data b of the read/write parameters RW1 through Rwp1 to be supplied to the RDC 9, and the number of transfer data c of the read/write parameters RWp2 through RWp3 to be supplied to the head IC 8.

A count value corresponding to the number of data of the control parameters to be supplied to each of the circuits 8 through 10 and stored in the register 122, is set in the counter 126. The number of transfer data a for the output of the starting address An to the servo parameter SB1 through SBm to be supplied to the servo information demodulation circuit 10, and the number of transfer data (a+b) for the output of the starting address An to the read/write parameters RW1 through RWp1 to be supplied to the RDC 9 are set in the counter 126.

The counter 126 counts down the set counted value and outputs the count result to the data determination part 124 every time the control parameters are output to each of the circuits 8 through 10 from the data determination part 124. When the count value a set in a counter part 126$a$ falls within the range of a to zero, the data determination part 124 supplies the control parameters SB1 through SBm stored in the data buffer 123 to the servo information demodulation circuit 10.

When the count value a set in the counter part 126$a$ becomes zero, the data determination part 124 supplies the control parameters RWp1 through RWp2-1 stored in the data buffer 123 to the RDC 9 until the count value (a+b) set in a counter part 126$b$ becomes zero.

Further, when the count value (a+b) set in the counter part 126$b$ becomes zero, the data determination part 124 supplies the control parameters RWp2 through RWp3 stored in the data buffer 123 to the head IC 8.

Next, a description will be given of the CPU 111.

Figure 7:
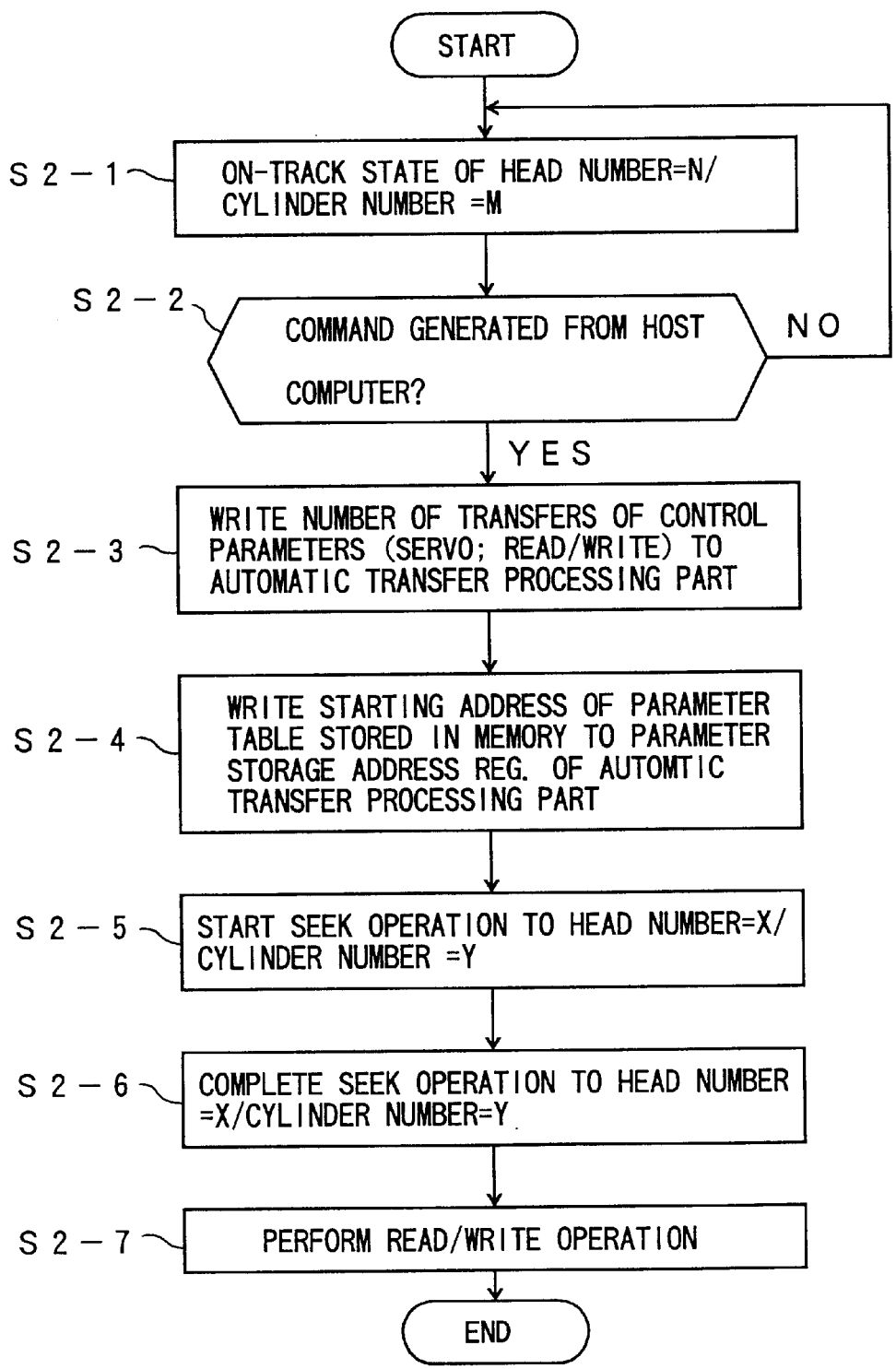
FIG. 7 is an operational flowchart at a time of a read/write operation according to the first embodiment of the present invention.

FIG. 7 is an operational flowchart of the CPU of the first embodiment of the present invention.

When the magnetic head 4 is in an on-track state at a position of head number N/cylinder number M on the magnetic disk 2 (step S2-1), and a command is supplied from the host computer (step S2-2), a control data transfer command is supplied to the DMA controller 121. The DMA controller 121 writes to the register 122 the number of transfer data of the control parameters to each of the circuits 8 through 10 (step S2-3).

When the number of transfer data of the control parameters to each of the circuits 8 through 10 is stored in step S2-3, a starting address of a selected one of the parameter tables 110-1 through 110-$n$ is written to the register 122 (step S2-4).

When the number of transfer data of the control parameters to each of the circuits 8 through 10 and the starting address are stored in the register 122 of the automatic transfer processing part 102 in step S2-4, the CPU 111 immediately starts a seek operation to the head number X/cylinder number Y specified by the read/write command (step S2-5).

Upon completing the seek operation to the head number X/cylinder number Y specified by the read/write command (step S2-6), the CPU 111 performs a read/write operation (step S2-7).

Figure 8:
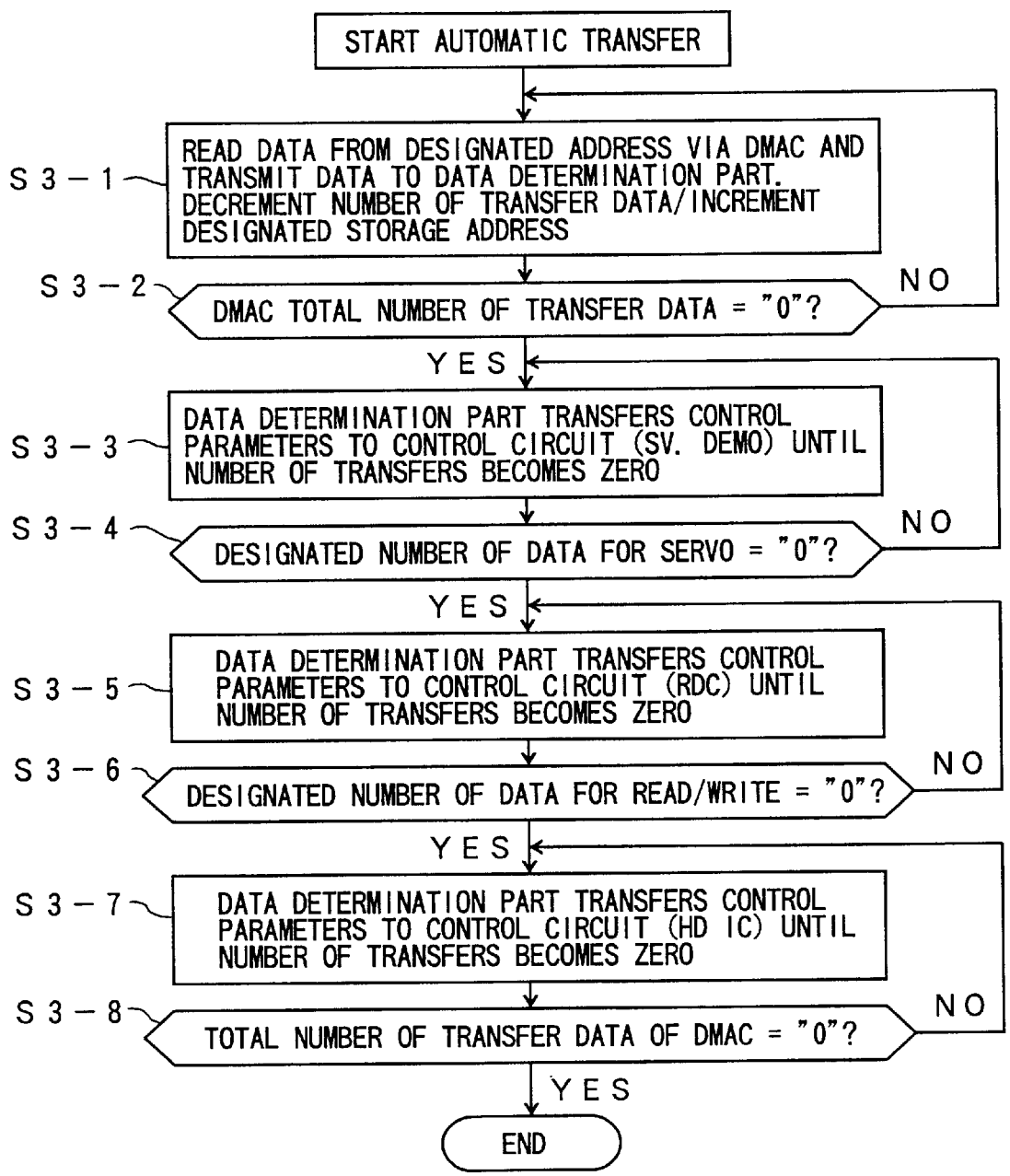
FIG. 8 is an operational flowchart of an automatic transfer processing part of the first embodiment of the present invention.

FIG. 8 is an operational flowchart of the automatic transfer processing part of the first embodiment of the present invention.

In the automatic transfer processing part 102, the control parameters are supplied to the DMA controller 121. When supplied with the control parameters, the DMA controller 121 decrements the total number of transfer data (a+b+c), which is the sum of the numbers of transfer data of the control parameters retained in the register 122 to be supplied to the circuits 8 through 10, and increments the address retained in the register 122 until the total number of transfer data (a+b+c) becomes zero (steps S3-1 and S3-2).

After the total number of designated transfer data (a+b+c) becomes zero in steps S3-1 and S3-2, the data determination part 124 transfers the servo parameters to the servo information demodulation circuit 10 until the number of transfer data a of the servo parameters set in the counter part 126$a$ becomes zero (steps S3-3 and S3-4).

Next, after the number of designated transfer data becomes zero in steps S3-3 and S3-4, the data determination part 124 transfers the read/write parameters to the RDC 9 until the number of transfer data (a+b) of the control parameters set in the counter part 126$b$ becomes zero (steps S3-5 and S3-6).

Next, after the number of designated transfer data becomes zero in steps S3-5 and S3-6, the data determination part 124 transfers the read/write parameters to the head IC 8 (steps S3-7 and S3-8).

Figure 9:
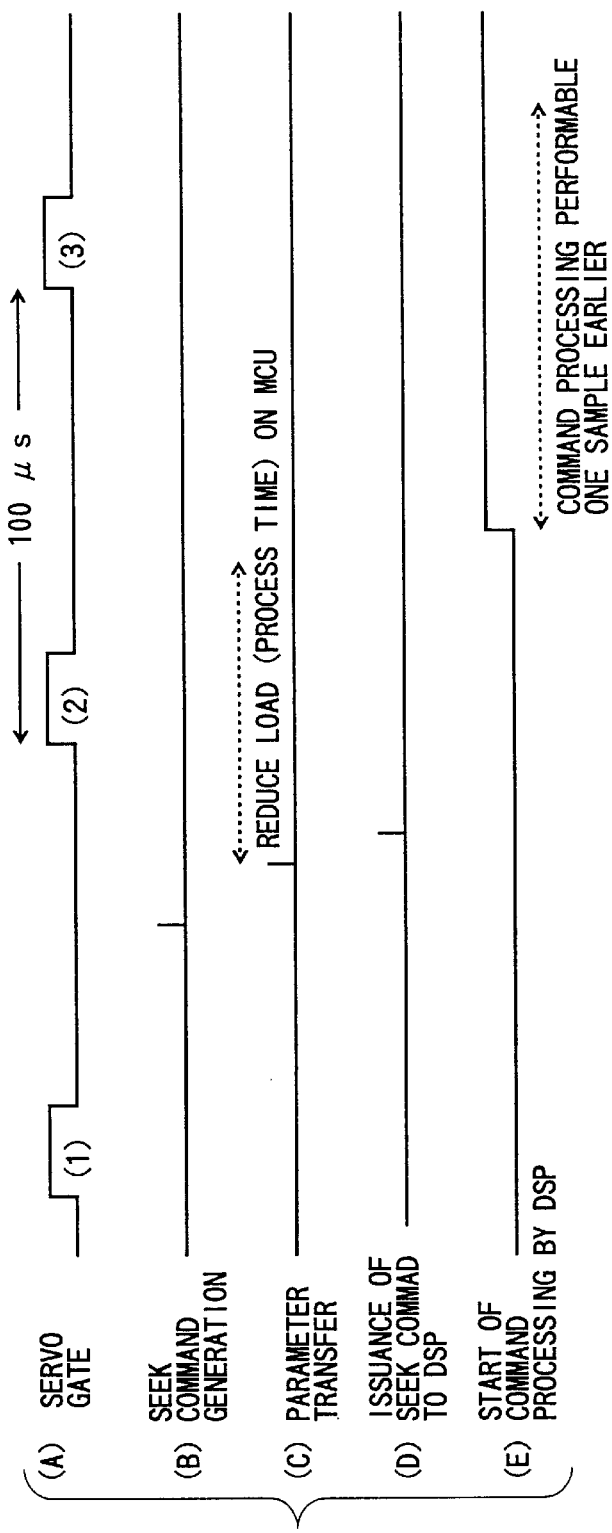
FIG. 9 is a timing chart of signals in the first embodiment of the present invention.

FIG. 9 is a timing chart of signals at the time of a read/write operation in the first embodiment of the present invention. FIG. 9(A) shows a servo gate signal, FIG. 9(B) shows a timing of a generation of a seek command, FIG. 9(C) shows a timing of a transfer of parameters, FIG. 9(D) shows a timing of issuance of a seek command to the DSP 17, and FIG. 9(E) shows a timing of the start of processing the command by the DSP 17.

As shown in FIG. 9, when the seek command is issued, the automatic transfer processing part 102 performs a parameter transfer process without imposing a load on the CPU 111. Therefore, the seek command is immediately issued to the DSP 17 so that the DSP 17 can perform a seek operation.

In this embodiment, the data transfer is performed with a reduced operational load on the CPU 111 by a method which switches transfer destinations based on the starting address and the number of transfer data of one of the control parameter tables 110-1 through 110-$n$ selected based on the zone/head number. However, it is also possible to insert switching codes between given control parameters and switch transfer destinations by the switching codes.

In a second embodiment, switching codes C1 and C2 and a table termination code C3 are inserted between given control parameters stored in parameter tables 210-1 through 210-$n$ stored in the memory 15.

Figure 10:
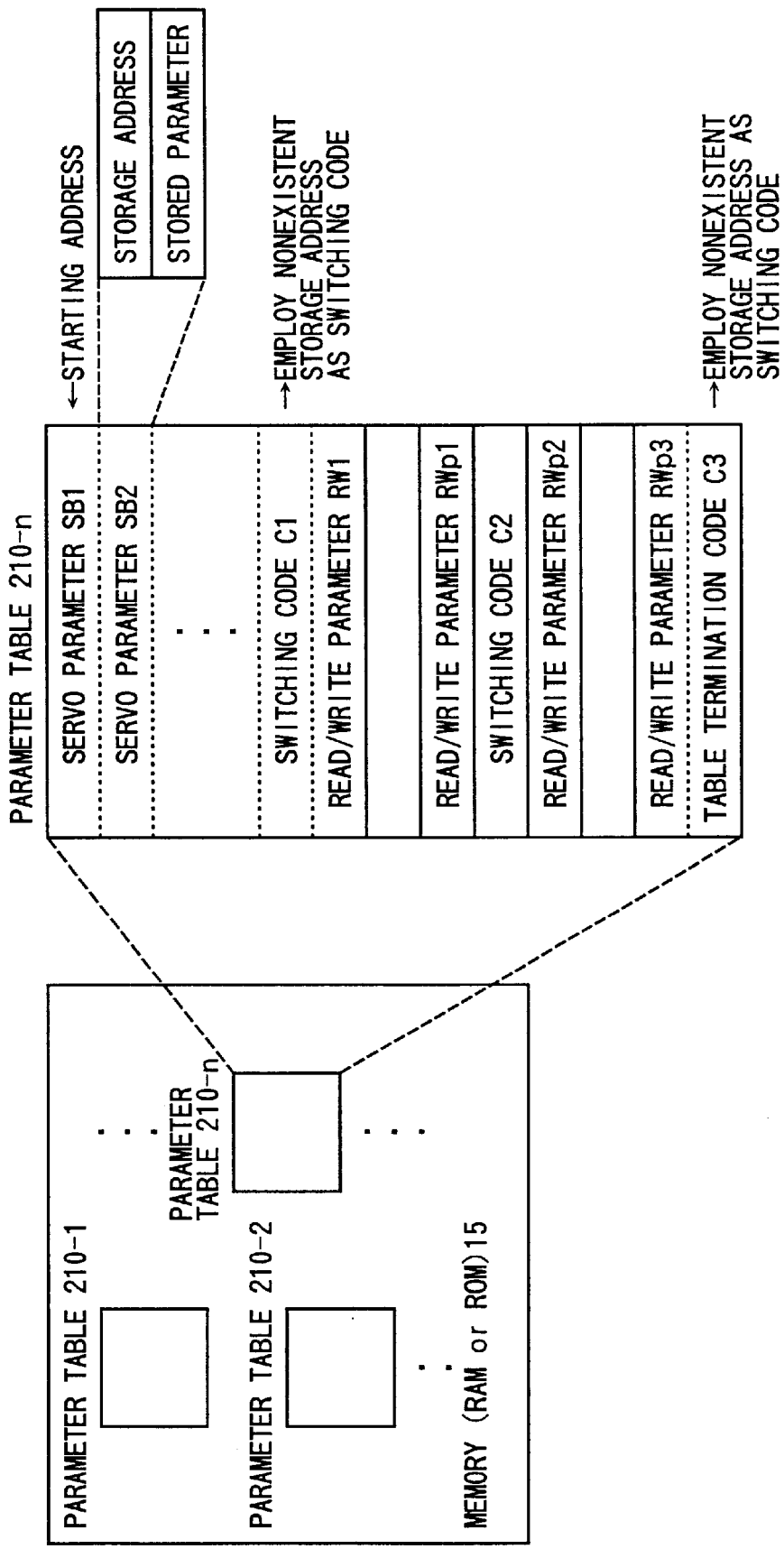
FIG. 10 is a diagram of a data structure of a parameter table of a second embodiment of the present invention.

FIG. 10 is a diagram of a data structure of a parameter table of the second embodiment of the present invention.

The parameter table 210-$n$ of this embodiment includes servo parameters SB1 through SBm and read/write parameters RW1 through RWp3. The servo parameters SB1 through SBm are supplied to the servo information demodulation circuit 10, the read/write parameters RW1 through RWp1 are supplied to the RDC 9, and the read/write parameters RWp2 through RWp3 are supplied to the head IC 8.

The switching code C1 is provided between the servo parameters SB1 through SBm supplied to the servo information demodulation circuit 10 and the read/write parameters RW1 through RWp1 supplied to the RDC 9. The switching code C2 is provided between the read/write parameters RW1 through RWp1 supplied to the RDC 9 and the read/write parameters RWp2 through RWp3 supplied to the head IC 8. Further, the table termination code C3, which shows the last address of the control parameter table 210-$n$, is added next to the read/write parameter RWp3 supplied to the head IC 8.

An automatic transfer processing part 202 provided in an MCU 201 of this embodiment switches the transfer destinations of the servo parameters SB1 through SBm and the read/write parameters RW1 through RWp3 by the above-described switching codes C1 and C2, and the termination code C3.

Figure 11:
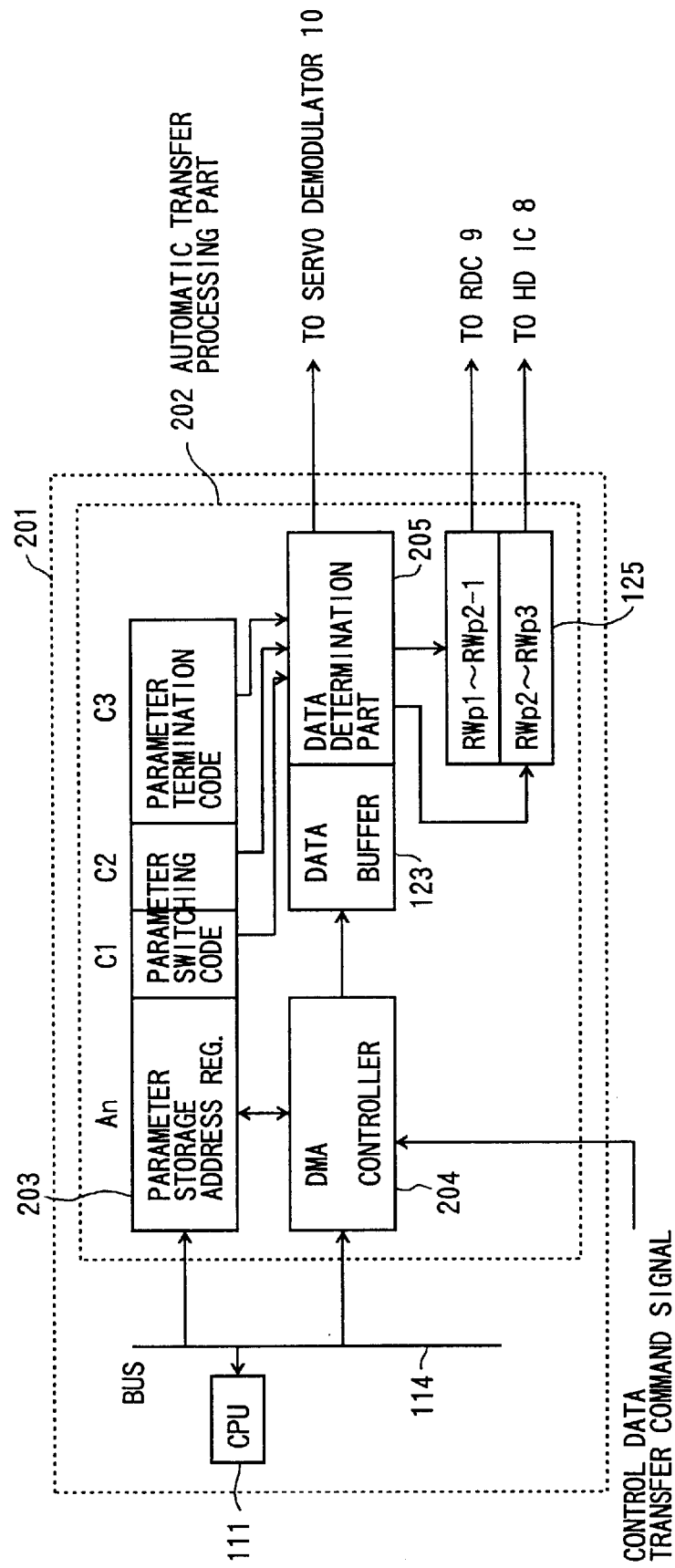
FIG. 11 is a block diagram of a structure of an MCU of the second embodiment of the present invention.

FIG. 11 is a block diagram of a structure of the MCU of the second embodiment of the present invention. In the figure, the same elements as those of FIG. 5 are referred to by the same numerals, and a description thereof will be omitted.

The MCU 201 of this embodiment stores a starting address An of the parameter table 210-$n$ selected based on a zone/head number, the switching codes C1 and C2, and the termination code C3 in a register 203.

A data determination part 205 compares data stored in the data buffer 123 with the switching codes C1 and C2 and the termination code C3 each set in the register 203, and switches the transfer destinations of the data stored in the data buffer 123 when the data stored in the data buffer 123 matches any of the switching codes C1 and C2, and the termination code C3. A DMA controller 204 controls the reading of the control parameters based on the total number of the control parameters.

Next, a description will be given of an operation of this embodiment.

Figure 12:
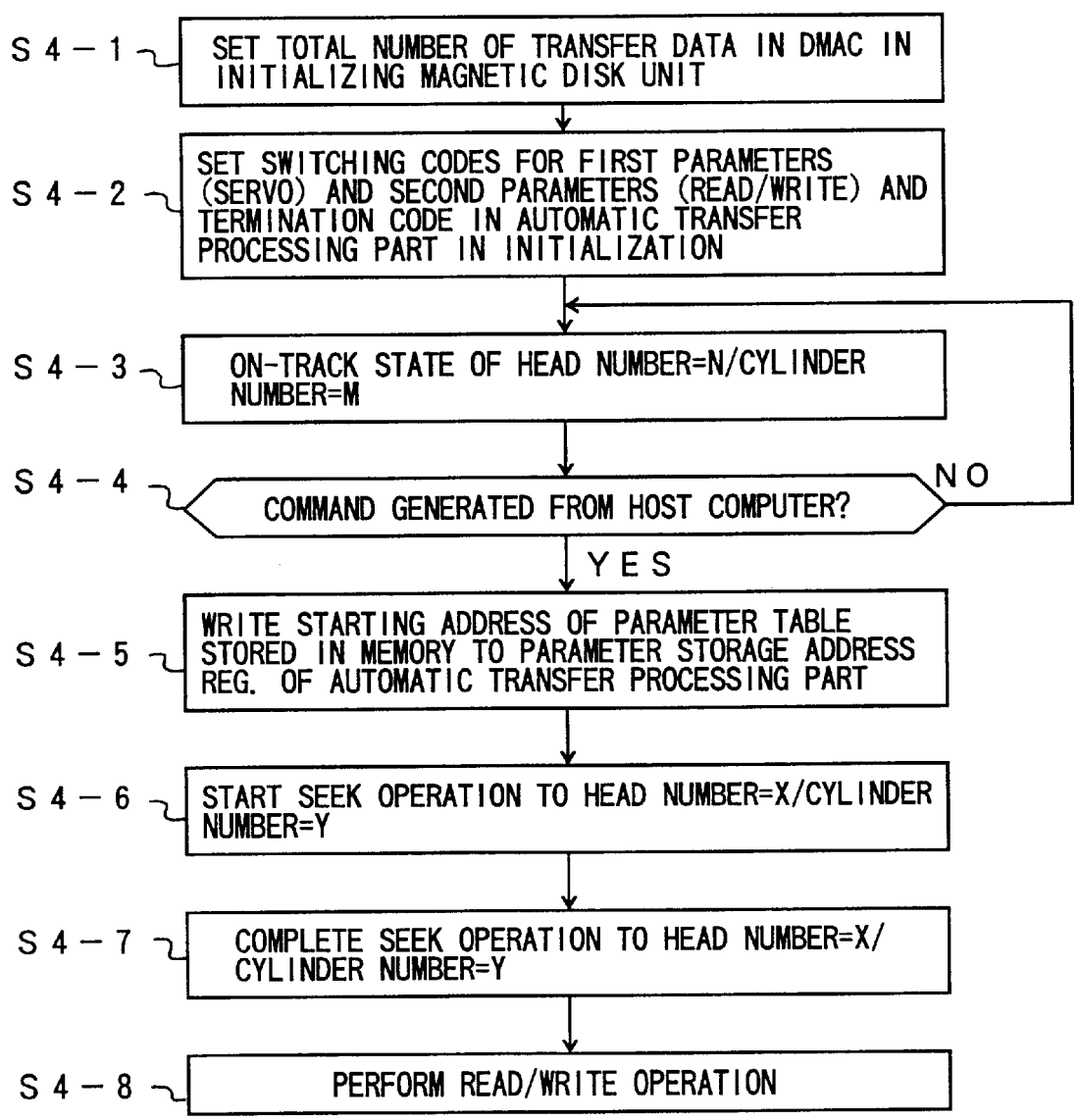
FIG. 12 is an operational flowchart of the MCU of the second embodiment of the present invention.

FIG. 12 is an operational flowchart of the MCU of the second embodiment of the present invention.

The CPU 111 of the MCU 201 sets the total number of transfer data of the control parameters in the DMA controller 204 of the automatic transfer processing part 202 at a time of initializing the magnetic disk unit (step S4-1).

The CPU 111 of the MCU 201 sets the switching codes C1 and C2, and the termination code C3 in the register 203 (step S4-2).

When receiving a read/write command from the host computer in an on-track state of the head number N/cylinder number M (steps S4-3 and S4-4), the MCU 201 selects the parameter table 210-$n$ which corresponds to a zone/head number from the parameter tables 210-1 through 210-$n$ stored in the memory 15, and stores the starting address An of the selected parameter table 210-$n$ in the register 203 (step S4-5). Thereby, the necessary data is set in the automatic transfer processing part 202, and the automatic transfer processing part 202 supplies the control parameters to the servo information demodulation circuit 10, the RDC 9, and the head IC 8.

After setting the data in the automatic transfer processing part 202 in step S4-5, the MCU 201 starts to perform a seek operation to the head number X/cylinder number Y (step S4-6), and after the seek operation to the head number X/cylinder number Y is completed (step S4-7), the MCU performs a read/write operation (step S4-8).

Next, a description will be given of an operation of the automatic transfer processing part 202.

Figure 13:
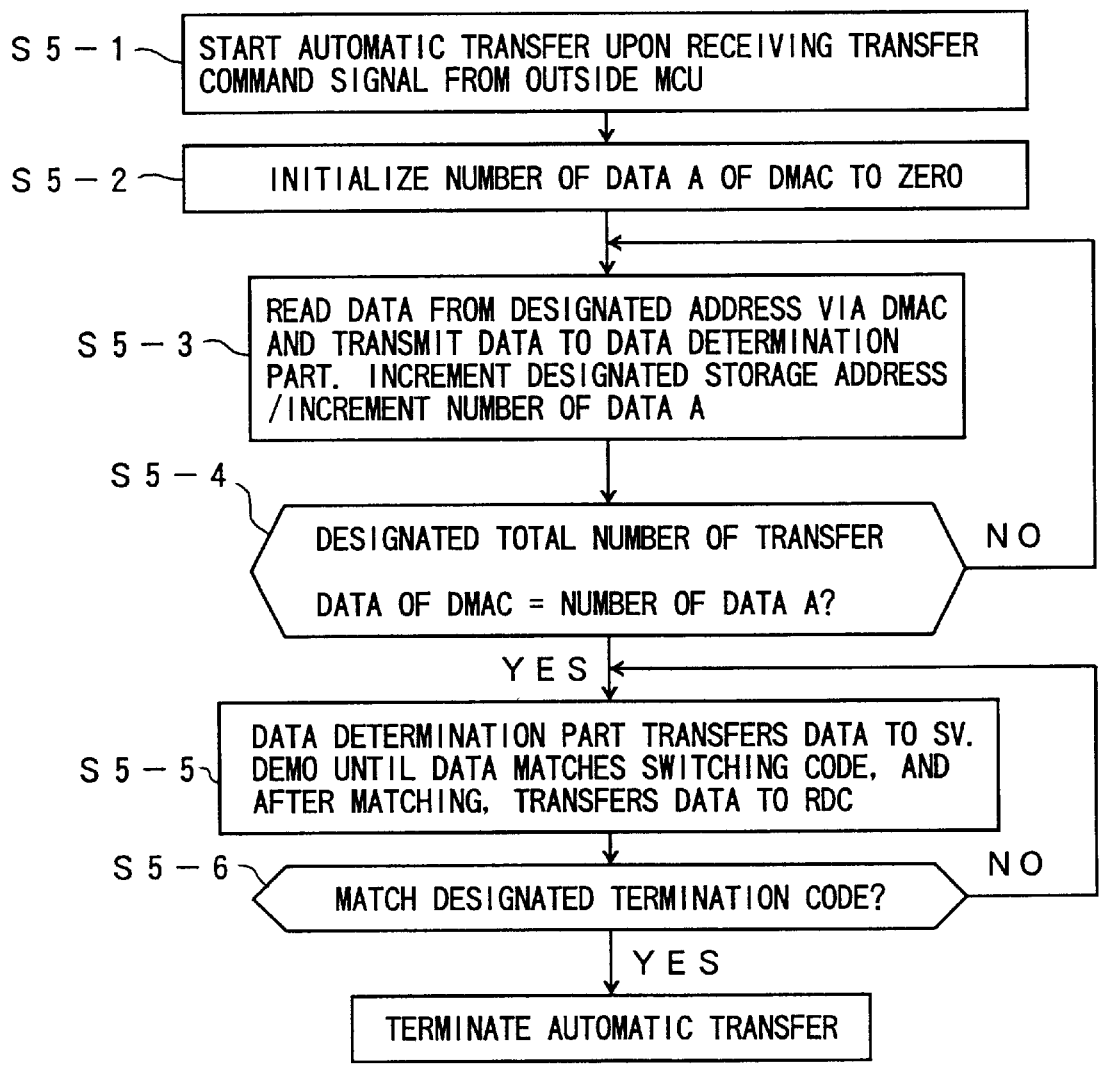
FIG. 13 is an operational flowchart of an automatic transfer processing part of the second embodiment of the present invention.

FIG. 13 is an operational flowchart of the automatic transfer processing part of the second embodiment of the present invention.

When supplied with a transfer command signal from the HDC 11, the DMA controller 204 starts an automatic transfer in the automatic transfer processing part 202 (step S5-1).

When the automatic transfer is started in step S5-1, the DMA controller 204 initializes the number of data A set therein to zero (step S5-2).

When the number of data A is initialized in step S5-2, the control parameters are read out from the parameter table 210-$n$, which corresponds to the zone/head number, and are supplied to the data buffer 123. The starting address stored in the register 203 is incremented, while the number of data A initialized in step S5-2 is incremented (step S5-3).

The DMA controller 204 repeats the above-described operation until the number of data A initialized in step S5-2 matches the total number of transfer data set in step S4-1 of FIG. 12 (step S5-4).

At this time, the data determination part 205 compares the data stored in the data buffer 123 with the switching codes C1 and C2 and the termination code C3 retained in the register 203 so as to supply the servo information demodulation circuit 10 with control parameters supplied during a period from the supply of initial data until the supply of data corresponding to the switching code C1, namely, with the servo parameters SB1 through SBm; to supply the RDC 9 with control parameters supplied during a period from the supply of the data corresponding to the switching code C1 until the supply of data corresponding to the switching code C2, namely, with the read/write parameters RW1 through RWp1; and to supply the head IC 8 with control parameters supplied during a period from the supply of the data corresponding to the switching code C2 until the supply of data corresponding to the termination code C3, namely, with the read/write parameters RWp2 through RWp3 (steps S5-5 and S5-6).

Thus, according to this embodiment, by inserting each of the switching codes C1 and C2, and the termination code C3 between the given control parameters, the transfer destinations of the parameters can be automatically switched by means of the switching codes C1 and C2, and the termination code C3.

In this embodiment, the transfer destinations of the parameters can be automatically switched by means of the switching codes C1 and C2, and the termination code C3 by inserting each of the switching codes C1 and C2, and the termination code C3 between the given control parameters. However, the present invention is not limited to this embodiment, but allows any variation which enables the transfer of parameters to respective circuits without causing the CPU 111 to operate, that is, any variation which enables DMA transfer.

Further, although the automatic transfer processing parts 102 and 202 are provided in the MCUs 101 and 201, respectively, in the above-described embodiments, each of the automatic transfer processing parts 102 and 202 may be incorporated into any of the RDC 9, the HDC 11, the head IC 8, the DSP 17, and the gate array 16.

Moreover, although the MCU, the gate array, and the DSP are separately provided in the above-described embodiments, the present invention is also applicable to an apparatus in which the MCU, the gate array, and the DSP are provided on a single chip.

Figure 15:
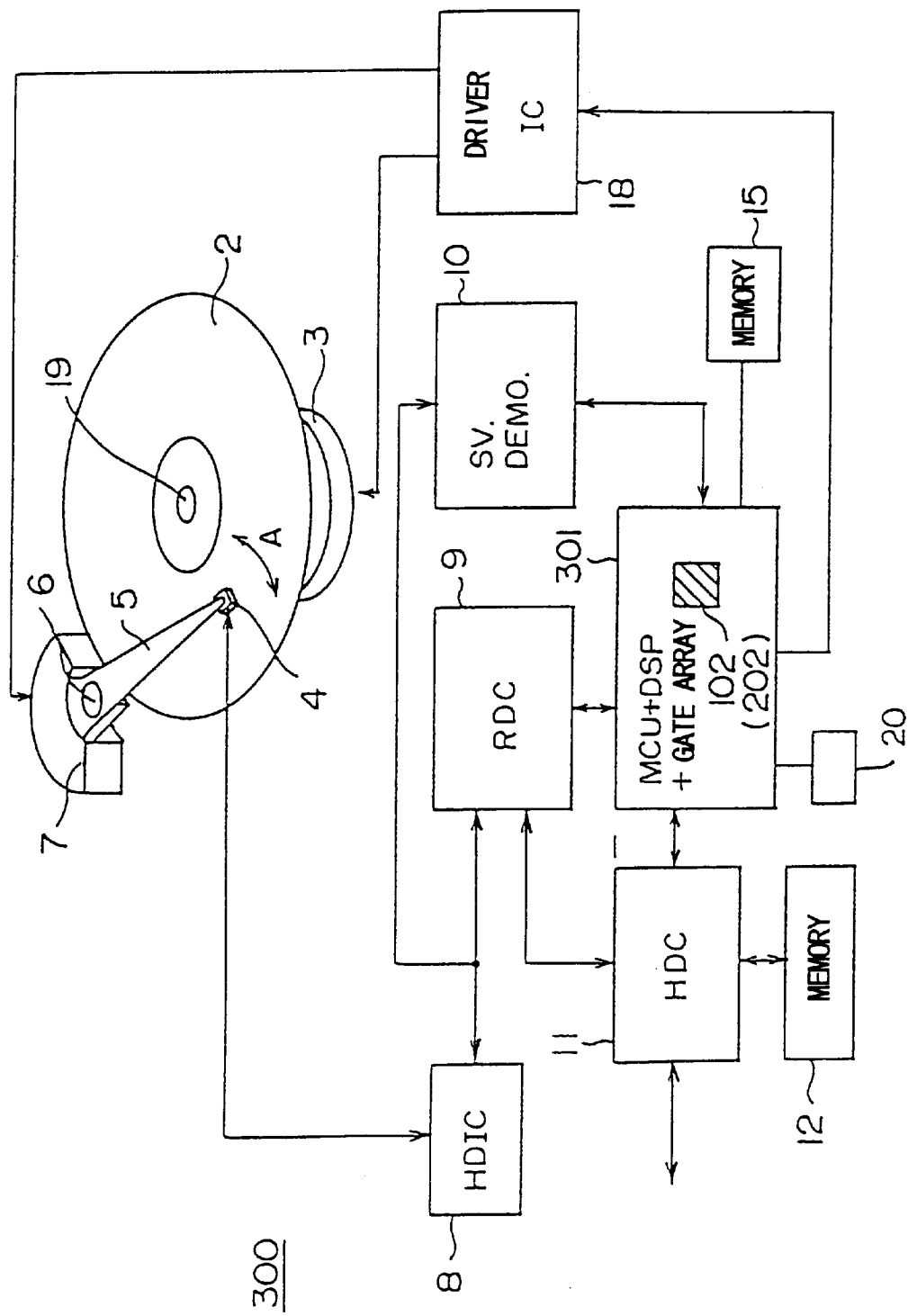
FIG. 15 is a block diagram of a third embodiment of the present invention.

FIG. 15 is a block diagram of a third embodiment of the present invention. In the figure, the same elements as those of FIG. 4 are referred to by the same numerals, and a description thereof will be omitted.

As shown in FIG. 15, a magnetic disk unit 300 of this embodiment includes the automatic transfer processing part 102 or 202 described in the first or second embodiment in an IC 301, on which the MCU, the gate array, and the DSP are provided. This structure can reduce a processing load on the CPU included in the IC 301, thus realizing a higher-speed read/write operation.

In the third embodiment, the description is given of the apparatus in which the MCU, the gate array, and the DSP are provided on the single chip. However, the present invention is also applicable to an apparatus in which more elements are provided on a single chip to form an IC.

Figure 14:
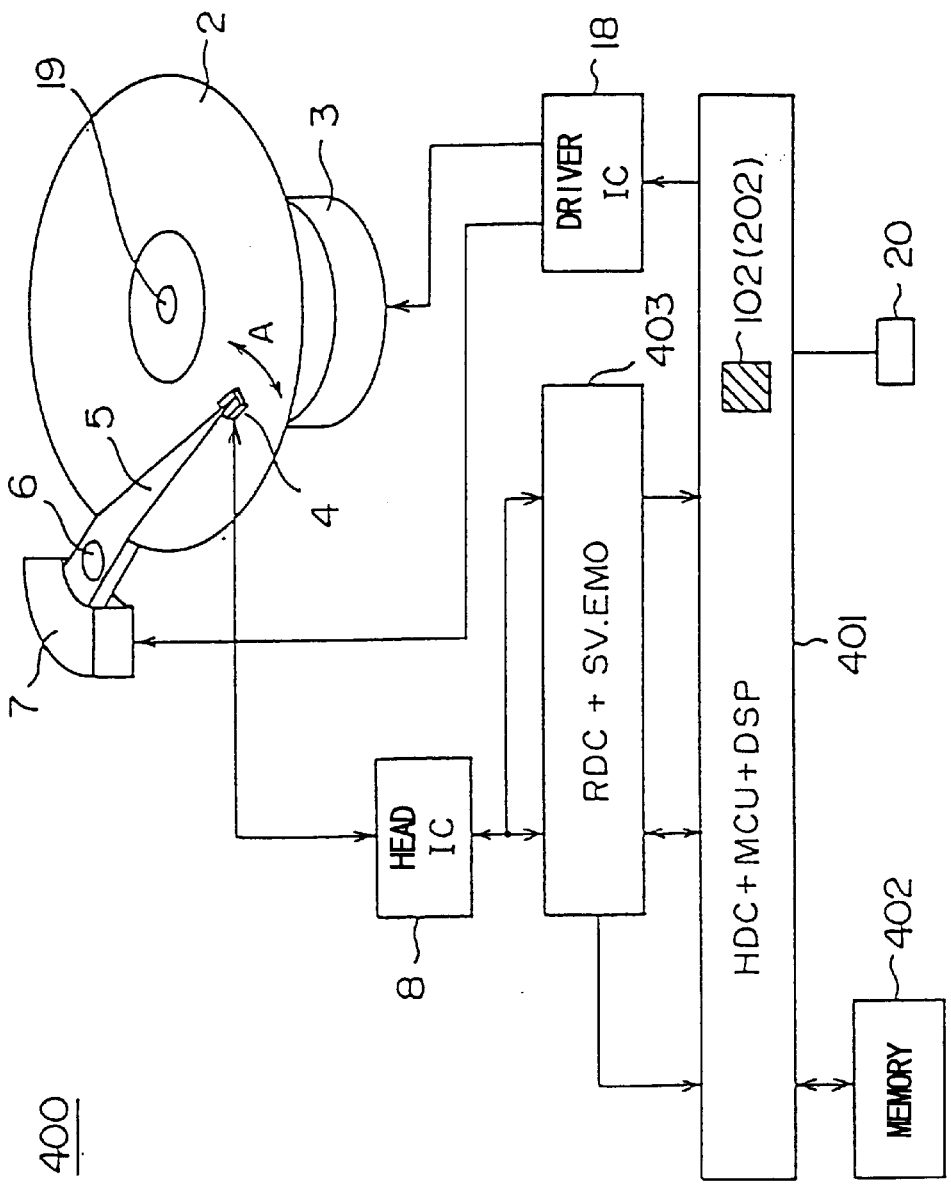
FIG. 14 is a block diagram of a fourth embodiment of the present invention.

FIG. 14 is a block diagram of a fourth embodiment of the present invention. In the figure, the same elements as those of FIG. 4 are referred to by the same numerals, and a description thereof will be omitted.

As shown in FIG. 14, according to a magnetic disk unit 400 of this embodiment, a memory 402 is connected to a first IC 401, on which the MCU, the HDC, and the DSP are provided, and an IC 403, on which the RDC and the servo information demodulation circuit are provided is further connected to the first IC 401. In this embodiment, the first IC 401 houses the automatic transfer processing part 102 or 202. This structure can reduce a processing load on the CPU included in the IC 401, thus realizing a higher-speed read/write operation.

Needless to say, the present invention is also applicable to an apparatus in which far more elements are provided on a single chip to form an IC. In short, the present invention allows any variation which transfers, by DMA transfer, control parameters from a memory storing the control parameters to respective circuits requiring the control parameters.

As described above, according to the present invention, the direct transfers of control information to the transfer designations save time spent in a control information reading operation. Therefore, other operations can be performed efficiently, thus allowing a high-speed reading/writing of information.

Further, according to the present invention, the control information is successively read out from a control information storage address based on the control information storage address and the number of data transferred to each of the transfer designations of the control information, and the transfer designations of the control information are only switched based on the number of data of the read control information. Therefore, distribution control of the control information can be performed easily.

Moreover, according to the present invention, a timing of the switching can be easily detected by counting down the retained number of data at a time of reading out the control information.

Furthermore, according to the present invention, transfer destination switching information is inserted into a given portion of control information so that the control information can be directly transferred to transfer destinations thereof by switching the transfer destinations when the transfer destination switching information is detected, thus saving time spent in a control information reading operation. Therefore, other operations can be performed efficiently, thus allowing a high-speed reading/writing of information.

What is claimed is:

1. An information storage apparatus including storage means for storing control information for controlling a state of access to a recording medium, and control means for controlling the state of access to the recording medium based on the control information, the information storage apparatus comprising:

transfer control means for transferring the control information stored in the storage means to the control means at a time of accessing the recording medium, the transfer control means comprising:

first retention means for retaining a control information storage address of the storage means where the control information is stored; second retention means for retaining number of units of data of the control information to be transferred to the control means;

control information reading means for successively reading out the control information of the number of units of data stored in said second retention means from the control information storage address stored in said first retention means; and data switching means for switching transfer destinations of the control information read out by said control information reading means based on the number of units of data stored in said second retention means.

2. The information storage apparatus as claimed in claim 1, wherein said data switching means comprises:

counting means for counting down the number of units of data stored in said second retention means every time the control information is read out by said control information reading means; and switching control means for switching the transfer destinations of the information control read out by said control information reading means when a count value of said counter means becomes zero.

3. The information storage apparatus as claimed in claim 1, wherein said transfer control means is formed integrally on an integrated circuit which forms the control means.

4. An information storage apparatus including storage means for storing control information for controlling a state of access to a recording medium, and control means for controlling the state of access to the recording medium based on the control information, the information storage apparatus comprising:

transfer control means for transferring the control information stored in the storage means to the control means at a time of accessing the recording medium, the transfer control means comprising:

first retention means for retaining a control information storage address of the storage means where the control information is stored;

second retention means for retaining transfer destination switching information inserted into the control information stored in the storage means;

third retention means for retaining transfer termination information stored at an end position of the control information stored in the storage means;

control information reading means for successively reading out the control information from the control information storage address stored in said first retention means; and data switching means for comparing the transfer destination switching information retained in said second retention means and the transfer termination information retained in said third retention means with the control information read out by said control information reading means so as to switch transfer destinations of the control information read out from said control information reading means when the control information read out by said control information reading means matches the transfer destination switching information retained in said second retention means, and to terminate a transfer of the control information read out by said control information reading means when the control information read out by said control information reading means matches the transfer termination information retained in said third retention means.

5. The information storage apparatus as claimed in claim 4, wherein said transfer control means is formed integrally on an integrated circuit which forms the control means.

6. A method of controlling an information storage apparatus prestoring control information for controlling a state of access to a recording medium and controlling the state of access to the recording medium based on the control information, characterized in that:

the control information stored in the storage means is transferred to thea control means at a time of accessing the recording medium.

7. The method as claimed in claim 6, wherein:

a control information storage address of the storage means where the control information is stored, and number of units of data of the control information to be transferred are retained; and the control information of the retained numbers of data are successively read out from the retained control information storage address, and transfer designations of the read control information are switched based on the number of units of data.

8. The method as claimed in claim 7, wherein the number of units of data are counted down every time the control information is read out, and the transfer destinations of the control information are switched when a count value becomes zero.

9. (Original) The method as claimed in claim 7, wherein:

the control information storage address where the control information is stored, transfer destination switching information inserted into the control information to switch the transfer destinations of the control information, and transfer termination information which indicates an end position of the control information are retained;

the control information is successively read out from the control information storage address to be compared with the transfer destination switching information and the transfer termination information;

the transfer destinations of the read control information are switched when the read control information matches the transfer destination switching information; and a transfer of the read control information is terminated when the read control information matches the transfer termination information.

* * * * *

UNITED STATES PATENT AND TRADEMARK OFFICE
CERTIFICATE OF CORRECTION

PATENT NO.     : 6,693,765 B2
DATED          : February 17, 2004
INVENTOR(S)    : Hideyuki Watanabe It is certified that error appears in the above-identified patent and that said Letters Patent is hereby corrected as shown below:

Column 12,
Line 20, after "stored," start a new paragraph.
Line 41, delete "information control" and substitute -- control information -- therefor.

Column 13,
Line 29, delete "thea" and substitute -- a -- therefor.

Column 14,
Line 13, delete "Original".

Signed and Sealed this

Thirteenth Day of July, 2004

JON W. DUDAS
*Acting Director of the United States Patent and Trademark Office*